US012142398B2

(12) United States Patent
Okamoto

(10) Patent No.: US 12,142,398 B2
(45) Date of Patent: Nov. 12, 2024

(54) WIRE WITH A TERMINAL HAVING REINFORCE MATERIAL

(71) Applicant: SUMITOMO WIRING SYSTEMS, LTD., Mie (JP)

(72) Inventor: Yuji Okamoto, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 380 days.

(21) Appl. No.: 17/774,423

(22) PCT Filed: Oct. 29, 2020

(86) PCT No.: PCT/JP2020/040583
§ 371 (c)(1),
(2) Date: May 4, 2022

(87) PCT Pub. No.: WO2021/095540
PCT Pub. Date: May 20, 2021

(65) Prior Publication Data

US 2022/0367085 A1 Nov. 17, 2022

(30) Foreign Application Priority Data

Nov. 11, 2019 (JP) ................................ 2019-203752

(51) Int. Cl.
*H01B 7/24* (2006.01)
*H01R 13/52* (2006.01)

(52) U.S. Cl.
CPC ........... *H01B 7/24* (2013.01); *H01R 13/5205* (2013.01)

(58) Field of Classification Search
CPC ...... H01B 7/24; H01R 13/5205; H01R 13/52; H01R 13/46; H01R 13/521; H01R 13/5208
See application file for complete search history.

(56) References Cited

U.S. PATENT DOCUMENTS 7,883,365 B2 * 2/2011 Saitou ................ H01R 13/5205 439/587
10,505,290 B2 * 12/2019 Kuroiwa .................. H01R 4/28
(Continued)

FOREIGN PATENT DOCUMENTS

JP 2005-259608 A 9/2005
JP 2010-092626 A 4/2010
(Continued)

*Primary Examiner* — Harshad C Patel
(74) *Attorney, Agent, or Firm* — Venjuris, P.C.

(57) ABSTRACT

The present disclosure suppresses, in a wire with terminal provided with a sealing member, buckling of a wire during insertion into a terminal mounting hole. A wire with terminal includes a wire having a core wire made of a conductor and an insulation coating covering the outer periphery of the core wire, a terminal connected to a lengthwise end portion of the wire, a tubular sealing member enclosing the outer periphery of the insulation coating, and a reinforcing material adhered to the outer peripheral surface of the insulation coating. The lengthwise end portion of the wire with terminal including the terminal and the sealing member is inserted into a terminal mounting hole of a housing. Also, the reinforcing material is provided in an area extending rearward from a rear end portion of the sealing member in an insertion direction into the terminal mounting hole.

4 Claims, 2 Drawing Sheets

(56) References Cited

U.S. PATENT DOCUMENTS

| | | | | |
|---|---|---|---|---|
| 10,608,370 B2 * | 3/2020 | Takeuchi | H01R 4/185 |
| 10,944,187 B2 * | 3/2021 | Takeuchi | H01R 4/188 |
| 11,152,718 B2 * | 10/2021 | Miyamura | H01R 4/5083 |
| 11,228,152 B2 * | 1/2022 | Miyamura | H01R 31/06 |
| 11,764,493 B2 * | 9/2023 | Takeuchi | H01R 4/28 439/775 |
| 11,881,644 B2 * | 1/2024 | Okamoto | H01R 4/70 |
| 11,888,250 B2 * | 1/2024 | Jo | H01R 4/28 |
| 11,888,277 B2 * | 1/2024 | Wi | H01R 4/5083 |
| 2010/0200272 A1 * | 8/2010 | Yoshinaga | H01B 13/0006 174/130 |
| 2018/0366842 A1 * | 12/2018 | Yamashita | H01B 7/0045 |
| 2019/0074629 A1 * | 3/2019 | Takeuchi | H01R 4/70 |

FOREIGN PATENT DOCUMENTS

| | | |
|---|---|---|
| JP | 2013-168257 A | 8/2013 |
| JP | 2017-076455 A | 4/2017 |

* cited by examiner

WIRE WITH A TERMINAL HAVING REINFORCE MATERIAL

CROSS REFERENCE TO RELATED APPLICATIONS

This application is a national phase of PCT application No. PCT/JP2020/040583, filed on 29 Oct. 2020, which claims priority from Japanese patent application No. 2019-203752, filed on 11 Nov. 2019, all of which are incorporated herein by reference.

TECHNICAL FIELD

The present disclosure relates to a wire with terminal.

BACKGROUND

Patent Document 1, for example, describes a wire with terminal attached to the housing of a connector. With this wire with terminal, a terminal fixed to an end portion of a wire is inserted into a terminal mounting hole of the housing.

Also, connectors having a wire with terminal such as described above in which the gap between the wire and the terminal mounting hole is sealed with a tubular sealing member made of rubber or a similar material are known. In such a connector, the tubular sealing member is mounted to the outer periphery of the wire at a position in the vicinity of the terminal. The terminal mounting hole is then sealed, by inserting the terminal and the sealing member into the terminal mounting hole.

PRIOR ART DOCUMENT

Patent Document

Patent Document 1: JP 2010-182616 A

SUMMARY OF THE INVENTION

Problems to be Solved

With a wire with terminal such as described above, the increasingly smaller diameter of wires means that the wire is more likely to buckle during insertion into the terminal mounting hole, which adversely affects the assemblability of the wire with terminal, thus leaving room for improvement in this respect. In particular, in the case where a sealing member is attached to the outer periphery of the wire, frictional force between the terminal mounting hole and the sealing member is added to the insertion resistance when inserting the wire with terminal into the terminal mounting hole, thus making the wire notably more likely to buckle.

In view of this, an object is to suppress, in a wire with terminal provided with a sealing member, buckling of a wire during insertion into a terminal mounting hole.

Means to Solve the Problem

A wire with terminal of the present disclosure is a wire with terminal including a wire having a core wire made of a conductor and an insulation coating covering an outer periphery of the core wire, a terminal connected to a lengthwise end portion of the wire, and a tubular sealing member enclosing an outer periphery of the insulation coating, with the lengthwise end portion including the terminal and the sealing member to be inserted in a terminal mounting hole of a housing of a connector, the wire with terminal including a reinforcing material adhered to an outer peripheral surface of the insulation coating, and the reinforcing material being provided in an area extending rearward from a rear end portion of the sealing member in an insertion direction into the terminal mounting hole.

Effect of the Invention

According to the present disclosure, buckling of a wire during insertion into a terminal mounting hole can be suppressed in a wire with terminal provided with a sealing member.

DETAILED DESCRIPTION TO EXECUTE THE INVENTION

Description of Embodiments of Disclosure

Figure 1:
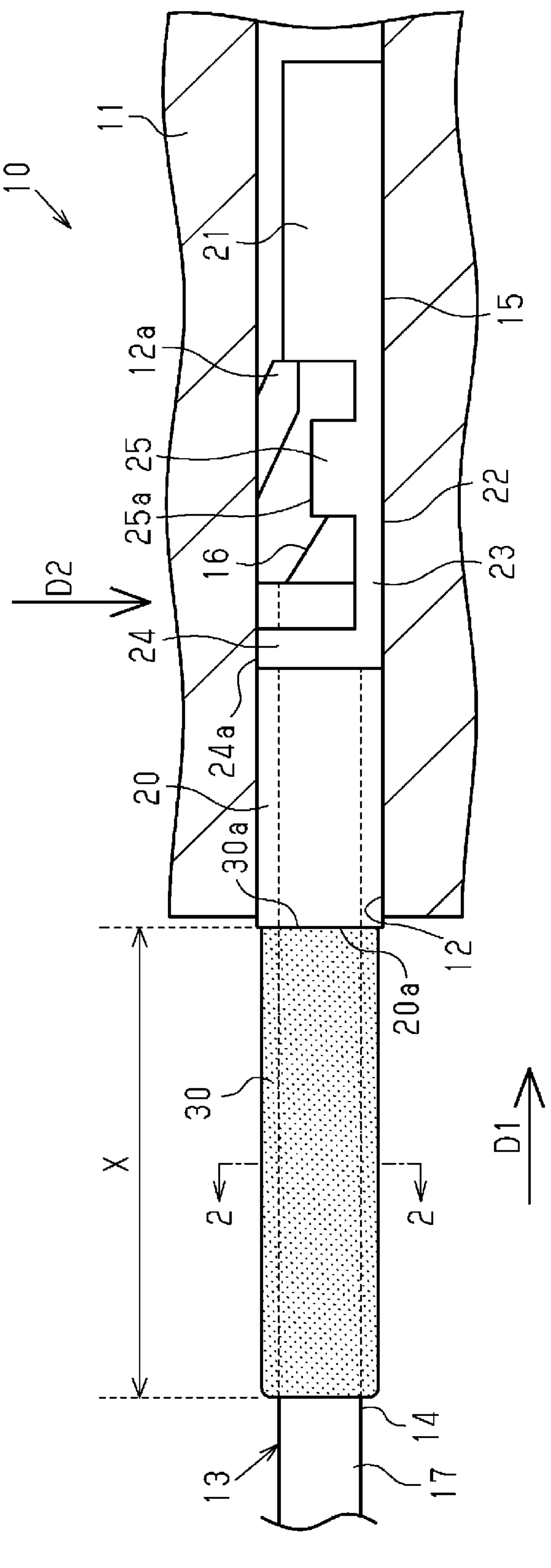
FIG. 1 is a cross-sectional view showing part of a connector according to an embodiment.

Initially, modes for carrying out the present disclosure will be enumerated and described.

[1] A wire with terminal of the present disclosure is a wire with terminal including a wire having a core wire made of a conductor and an insulation coating covering an outer periphery of the core wire, a terminal connected to a lengthwise end portion of the wire, and a tubular sealing member enclosing an outer periphery of the insulation coating, with the lengthwise end portion including the terminal and the sealing member to be inserted in a terminal mounting hole of a housing of a connector, the wire with terminal including a reinforcing material adhered to an outer peripheral surface of the insulation coating, and the reinforcing material being provided in an area extending rearward from a rear end portion of the sealing member in an insertion direction into the terminal mounting hole. According to this configuration, buckling of the wire can be suppressed by the reinforcing material, when inserting the terminal and the sealing member into the terminal mounting hole.

[2] Preferably an inner peripheral surface of the sealing member is in intimate contact with the outer peripheral surface of the insulation coating along an entirety of the sealing member in the lengthwise direction, and the reinforcing material opposes the rear end portion of the sealing member in the lengthwise direction. According to this configuration, the reinforcing material is not interposed between the outer peripheral surface of the insulation coating and the inner peripheral surface of the sealing member, thus enabling the sealability of the sealing member to be readily secured.

[3] Preferably a front end portion of the reinforcing material in the insertion direction is located outside the terminal mounting hole.

According to this configuration, buckling of the wire during insertion into the terminal mounting hole can be suppressed, while favorably securing the sealability of the terminal mounting hole with the sealing member.

[4] Preferably, the wire with terminal includes the reinforcing material and an unreinforced part where the reinforcing material is not provided, in a circumferential direction of the wire.

According to this configuration, the reinforcing material is partially provided in the circumferential direction of the wire, thus enabling the amount of material that is used for the reinforcing material to be suppressed, compared to the case where the reinforcing material is provided around the entire circumference of the wire, and also enabling the increase in weight of the wire due to providing the reinforcing material and the increase in diameter of the wire where the reinforcing material is provided to be suppressed.

Detailed Description of Embodiments of Disclosure

Specific examples of a wire with terminal of the present disclosure will be described below with reference to the drawings. Note that the present invention is not limited to these illustrative examples and is defined by the claims, and all changes that come within the meaning and range of equivalency of the claims are intended to be embraced therein. In the drawings, the configuration may be partially exaggerated or simplified for convenience of description. Also, the size ratios of the various portions may be different from actual size.

A connector 10 shown in FIG. 1 is, for example, a connector that is used in a vehicle wire harness for achieving electrical connection of in-vehicle devices. The connector 10 includes a housing 11 and a wire with terminal 13 assembled by being inserted into a terminal mounting hole 12 of the housing 11.

The wire with terminal 13 includes a wire 14, a terminal 15 fixed to a lengthwise end portion of the wire 14, and a tubular sealing member 20 enclosing the outer periphery of an insulation coating 17 in the vicinity of the terminal 15.

Figure 2:
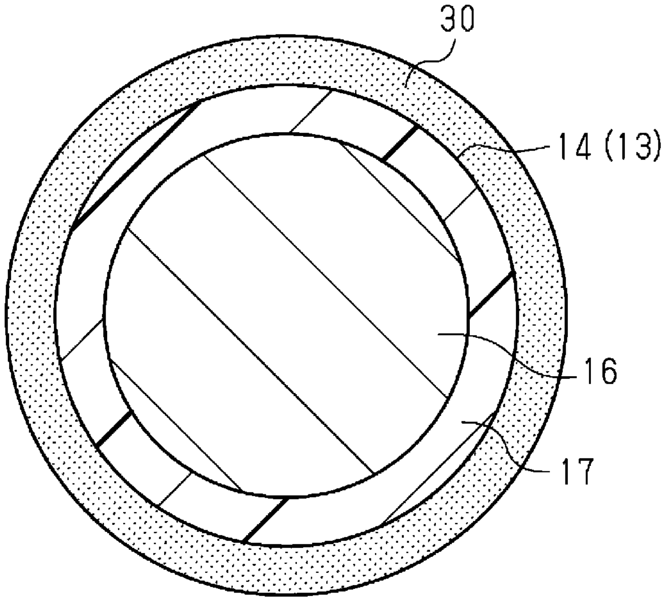
FIG. 2 is cross-sectional view taken along line 2-2 in FIG. 1.

As shown in FIGS. 1 and 2, the wire 14 has a core wire 16 and the insulation coating 17 covering the outer periphery of the core wire 16. At the lengthwise end portion of the wire 14, the insulation coating 17 has been stripped and the core wire 16 is exposed. For example, a stranded wire in which a plurality of metal wires are twisted together can be used for the core wire 16. Also, as for the metal material forming the core wire 16, an aluminum-based or copper-based metal material, for example, can be used. Also, the core wire 16 and the insulation coating 17 are formed by extrusion molding, for example.

As shown in FIG. 1, the terminal 15 and the sealing member 20 are inserted into the terminal mounting hole 12 in an insertion direction D1 along the lengthwise direction of the wire 14. Hereinafter, the front end in the insertion direction D1 and the rear end in the insertion direction D1 may be simply described as the front end and the rear end, respectively.

The terminal 15 is, for example, formed from a metal plate material by a pressing process. On the front end side of the terminal 15 is formed a counterpart connection part 21 to be connected to a counterpart terminal not shown. Also, a fixing part 22 in which the lengthwise end portion of the wire 14 is fixed is formed on the rear end side relative to the counterpart connection part 21 of the terminal 15.

The fixing unit 22 has a pair of first crimping pieces 24 extending from a base part 23 of the terminal 15 and a pair of second crimping pieces 25 likewise extending from the base part 23. Note that FIG. 1 shows a state in which only the first crimping piece 24 on the near side and the second crimping piece 25 on the near side of the pair of first crimping pieces 24 and the pair of second crimping pieces 25 are visible.

The first crimping pieces 24 are formed at the rear end portion of the terminal 15. The second crimping pieces 25 are formed at a position between the first crimping pieces 24 and the counterpart connection part 21. The first crimping pieces 24 fix the insulation coating 17 of the wire 14 by crimping. Also, the second crimping pieces 25 fix the core wire 16 exposed from the insulation coating 17 by crimping, and electrical conduction between the terminal 15 and the core wire 16 is thereby established.

Note that, in the first crimping pieces 24, the end portion on the side that connects to the base part 23 is a fixing end, and the tip extending from the base part 23 is a free end 24*a*. Similarly, in the second crimping pieces 25, the end portion on the side that connects to the base part 23 is a fixing end, and the tip extending from the base part 23 is a free end 25*a*.

When fixing the wire 14 in the fixing part 22, first, the free ends 24*a* of the first crimping pieces 24 and the free ends 25*a* of the second crimping pieces 25 are placed in an opened state, and the lengthwise end portion of the wire 14 is disposed on the base part 23 of the fixing part 22. Thereafter, the first crimping pieces 24 are crimped from a crimping direction D2 by being deformed so as to enclose the insulation coating 17. Also, the second crimping pieces 25 are crimped from the crimping direction D2 by being deformed so as to enclose the exposed region of the core wire 16.

The entirety of the terminal 15 and the region of the wire 14 in the vicinity of the terminal 15 are inserted in the terminal mounting hole 12. An elastically deflectable latching piece 12*a* for preventing the inserted terminal 15 from coming out is formed inside the terminal mounting hole 12. In the process of inserting the terminal 15 into the terminal mounting hole 12, the latching piece 12*a* interferes with the front end of the terminal 15 and is elastically deflected. Upon the terminal 15 reaching the mounting position, the latching piece 12*a* elastically returns and latches on the terminal 15, and the terminal 15 is fixed by this latching operation.

The sealing member 20 is interposed in a compressed state between the outer peripheral surface of the insulation coating 17 and the inner peripheral surface of the terminal mounting hole 12. This sealing member 20 suppresses infiltration of water and the like into the terminal mounting hole 12. Note that rubber or a similar material capable of sealing between the outer peripheral surface of the insulation coating 17 and the inner peripheral surface of the terminal mounting hole 12 can be used for the material forming this sealing member.

The sealing member 20 is disposed on the rear end side of the terminal 15. In this embodiment, the front end portion of the sealing member 20 is provided so as to come in contact with, or oppose via a small gap, the rear end portion of the terminal 15 in the lengthwise direction of the wire 14. Also, the position of a rear end portion 20*a* of the sealing member 20 in the lengthwise direction of the wire 14 is set to a position at which the sealing member 20 protrudes externally the terminal mounting hole 12.

The area of the wire 14 close to the rear end portion 20*a* of the sealing member 20 functions as a holding area X that is held when assembling the wire with terminal 13 in the terminal mounting hole 12. When the terminal 15 and the sealing member 20 are inserted into the terminal mounting hole 12, the operator himself or herself or an automatic assembly device holds the holding area X of the wire 14 without directly touching the terminal 15, and applies an insertion force in the insertion direction D1 to the wire with terminal 13. At this time, rearward insertion resistance caused by the elastic restoring force of the latching piece 12*a* and the frictional force between the terminal mounting hole 12 and the sealing member 20 act on the wire 14, and there is a risk that the region of the wire 14 from the holding area X to the rear end portion 20*a* of the sealing member 20 will buckle and deform.

As a countermeasure against buckling of the wire 14 described above, a reinforcing material 30 is provided in an area of the wire 14 from a region including the holding area X to the rear end portion 20*a* of the sealing member 20. A front end portion 30*a* of the reinforcing material 30 is in a positional relationship of coming in contact with or being slightly spaced away from the rear end portion 20*a* of the sealing member 20.

The reinforcing material 30 is formed with a synthetic resin applied to the outer peripheral surface of the insulation coating 17. A material having flexibility when applied to the insulation coating 17 and having the characteristic of curing after application is used for the material forming the reinforcing material 30. Polyvinyl chloride (PVC) and a photocurable resin that cures due to irradiation of ultraviolet light, visible light or the like are given as examples of the material forming the reinforcing material 30.

As shown in FIG. 2, the reinforcing material 30 of the embodiment has a tubular shape concentric with the wire 14. The reinforcing material 30 is formed in an adhered state so as to enclose the insulation coating 17 around the entire circumference thereof. Note that the reinforcing material 30 is formed by being applied to the outer peripheral surface of the insulation coating 17 from a direction along the crimping direction D2 of the fixing part 22.

The operation of this embodiment will now be described.

The reinforcing material 30 is applied to the outer peripheral surface of the insulation coating 17, in an area of the wire 14 from a region including the holding area X to the rear end portion 20*a* of the sealing member 20. The region of the wire 14 where the reinforcing material 30 is applied is thereby thickened, and rigidity against bending is improved. Accordingly, when holding the holding area X and inserting the end portion of the wire with terminal 13 including the terminal 15 into the terminal mounting hole 12, buckling of the wire 14 in the region from the holding area X to the terminal 15 will be suppressed.

The effect of this embodiment will now be described.

(1) The reinforcing material 30 is provided in an area extending rearward from the rear end portion 20*a* of the sealing member 20 in the insertion direction D1. According to this configuration, when the terminal 15 and the sealing member 20 are inserted into the terminal mounting hole 12, buckling of the wire 14 can be suppressed by the reinforcing material 30. In particular, in recent years, reducing the diameter of the wire 14 has been desired in order to reduce the weight of the vehicle, and thus suppressing buckling of the wire 14 with the reinforcing material 30 is most important to achieving a reduction in the diameter of the wire 14.

(2) The inner peripheral surface of the sealing member 20 is in intimate contact with the outer peripheral surface of the insulation coating 17, along an entirety of the sealing member 20 in the lengthwise direction of the wire 14. Also, the reinforcing material 30 opposes the rear end portion 20*a* of the sealing member 20 in the lengthwise direction of the wire 14. According to this configuration, the reinforcing material 30 is not interposed between the outer peripheral surface of the insulation coating 17 and the inner peripheral surface of the sealing member 20, and thus the sealability of the sealing member 20 can be readily secured.

(3) Since the front end portion 30*a* of the reinforcing material 30 in the insertion direction D1 is located outside the terminal mounting hole 12, buckling of the wire 14 during insertion into the terminal mounting hole 12 can be suppressed, while favorably securing the sealability of the terminal mounting hole 12 with the sealing member 20.

The embodiment can be implemented by being modified as follows. The embodiment and the following modifications can be implemented in combination with each in so far as no technical incompatibilities arise.

Figure 3:
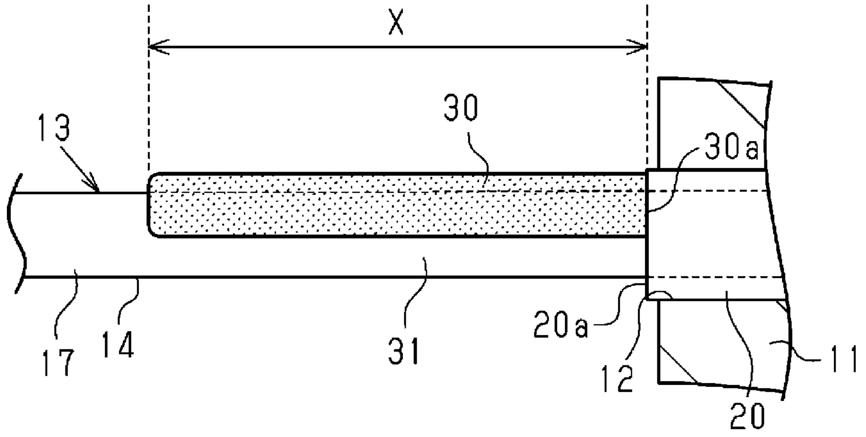
FIG. 3 is a cross-sectional view showing part of a connector in a variation.

As shown in FIG. 3, the reinforcing material 30 may be partially provided in the circumferential direction of the wire 14. In the configuration shown in FIG. 3, in the area where the reinforcing material 30 is provided in the lengthwise direction of the wire 14, the reinforcing material 30 and an unreinforced part 31 where the reinforcing material 30 is not provided are set in the circumferential direction of the wire 14. The unreinforced part 31 is a region where the reinforcing material 30 is not applied, and the outer peripheral surface of the insulation coating 17 is exposed in the non-reinforcing part 31. Note that the reinforcing material 30 is formed by being applied to the outer peripheral surface of the insulation coating 17 from a direction along the crimping direction D2 of the fixing part 22. That is, assuming the free end 24*a* and 25*a* sides of the crimping pieces 24 and 25 of the fixing part 22 are on the upper side of the wire with terminal 13, the reinforcing material 30 is provided over an area on the upper side of the insulation coating 17. Also, in this embodiment, the application area of the reinforcing material 30 occupies approximately half of the wire 14 in the circumferential direction.

According to such a configuration, the amount of material that is used for the reinforcing material 30 can be suppressed, compared to the case where the reinforcing material 30 is provided around the entire circumference of the wire 14, and, also, the increase in weight of the wire 14 due to providing the reinforcing material 30 and the increase in diameter of the wire 14 where the reinforcing material 30 is provided can be suppressed. Note that, the area occupied by the reinforcing material 30 in the circumferential direction of the wire 14 is not limited to the example shown in FIG. 3, and may be less than 180 degrees or more than 180 degrees.

In the above embodiment, the position of the rear end portion 20*a* of the sealing member 20 in the lengthwise direction of the wire 14 is set to a position protruding externally from the terminal mounting hole 12, but, alternatively, the position of the rear end portion 20*a* of the sealing member 20 may, for example, be set to the same position as the rear end portion (i.e., wire outlet) of the terminal mounting hole 12. Also, a configuration may be adopted in which the rear end portion 20*a* of the sealing member 20 is located inside the terminal mounting hole 12.

A configuration may be adopted in which part of the reinforcing material 30 is interposed between the outer peripheral surface of the insulation coating 17 and the inner peripheral surface of the sealing member 20.

In the embodiment shown in FIG. 3, the insulation coating 17 may, in cross-sectional view, have a first outer peripheral surface portion extending in the circumferential direction and a second outer peripheral surface portion extending in the circumferential direction. The reinforcing material 30 may be provided on the first outer peripheral surface portion.

The reinforcing material 30 may not be provided on the second outer peripheral surface portion and the insulation coating 17 may be exposed (i.e., unreinforced part 31 may be provided).

The reinforcing material 30 may extend to the sealing member 20 in the lengthwise direction of the wire 14. That is, the reinforcing material 30 may come in contact with the sealing member 20 or be provided with a slight gap therebetween in the lengthwise direction of the wire 14.

The reinforcing material 30, in cross-sectional view similar to FIG. 2, is formed without interruption around the insulation coating 17, and may extend continuously at a given thickness.

In the embodiment shown in FIG. 3, the circumferential end portions of the reinforcing material 30 in cross-sectional view may gradually terminate along the outer peripheral surface of the insulation coating 17.

The terminal mounting hole 12 may have a rectangular cross-section in cross-sectional view similar to FIG. 2. In this case, the sealing member 20 may come in contact with all vertical and horizontal surfaces of the terminal mounting hole 12 in cross-sectional view.

The terminal mounting hole 12 may have a circular cross-section in cross-sectional view similar to FIG. 2. In this case, the sealing member 20 may come in contact with the inner surface of the terminal mounting hole 12 around the entire circumference in cross-sectional view.

The thickness of the insulation coating 17 in cross-sectional view similar to FIG. 2 may be sufficiently thin relative to the thickness of the core wire 16.

The thickness of the reinforcing material 30 in cross-sectional view similar to FIG. 2 may be sufficiently thin relative to the thickness of the core wire 16.

The thickness of the sealing member 20 in cross-sectional view similar to FIG. 2 may be sufficiently thin relative to the thickness of the core wire 16.

The total length of the area in which the reinforcing material 30 is provided and the area in which the sealing member 20 is provided in the lengthwise direction of the wire 14 may be equal to or longer than the length of the terminal 15 in the lengthwise direction of the wire 14. Buckling of the wire 14 when inserting the wire 14 to which the terminal 15 is fixed into the terminal mounting hole 12 can thereby be more effectively prevented by the reinforcing material 30 and the sealing member 20.

The front end portion of the sealing member 20 may be located forward of the first crimping pieces 24 in the insertion direction D1 into the terminal mounting hole 12. In this case, the first crimping pieces 24 may crimp the wire with terminal 13 in direct contact with the sealing member 20 on the insulation coating 17, rather than crimping the wire with terminal 13 in direct contact with the insulation coating 17.

The reinforcing material 30 may have a first elasticity and the sealing member 20 may have a second elasticity. The first elasticity may be higher than the second elasticity.

LIST OF REFERENCE NUMERALS

10 Connector
11 Housing
12 Terminal mounting hole
12*a* Latching piece
13 Wire with terminal
14 Wire
15 Terminal
16 Core wire
17 Insulation coating
20 Sealing member
20*a* Rear end portion
21 Counterpart connection part
22 Fixing part
23 Base part
24 First crimping piece
24*a* Free end
25 Second crimping piece
25*a* Free end
30 Reinforcing material
30*a* Front end portion
31 Unreinforced part
D1 Insertion direction
D2 Crimping direction
X Holding area

What is claimed is:

1. A wire with terminal including a wire having a core wire made of a conductor and an insulation coating covering an outer periphery of the core wire, a terminal connected to a lengthwise end portion of the wire, and a tubular sealing member enclosing an outer periphery of the insulation coating, with the lengthwise end portion including the terminal and the sealing member to be inserted in a terminal mounting hole of a housing of a connector, the wire with terminal comprising:

a reinforcing material adhered to an outer peripheral surface of the insulation coating, wherein the reinforcing material is provided in an area extending rearward from a rear end portion of the sealing member in an insertion direction into the terminal mounting hole.

2. The wire with terminal according to claim 1, wherein an inner peripheral surface of the sealing member is in intimate contact with the outer peripheral surface of the insulation coating along an entirety of the sealing member in the lengthwise direction, and the reinforcing material opposes the rear end portion of the sealing member in the lengthwise direction.

3. The wire with terminal according to claim 1, wherein a front end portion of the reinforcing material in the insertion direction is located outside the terminal mounting hole.

4. The wire with terminal according to claim 1, comprising:

the reinforcing material and an unreinforced part where the reinforcing material is not provided, in a circumferential direction of the wire.

* * * * *